(No Model.)
J. H. MEARS.
CHLORINATING ORES AND APPARATUS THEREFOR.
No. 269,441. Patented Dec. 19, 1882.
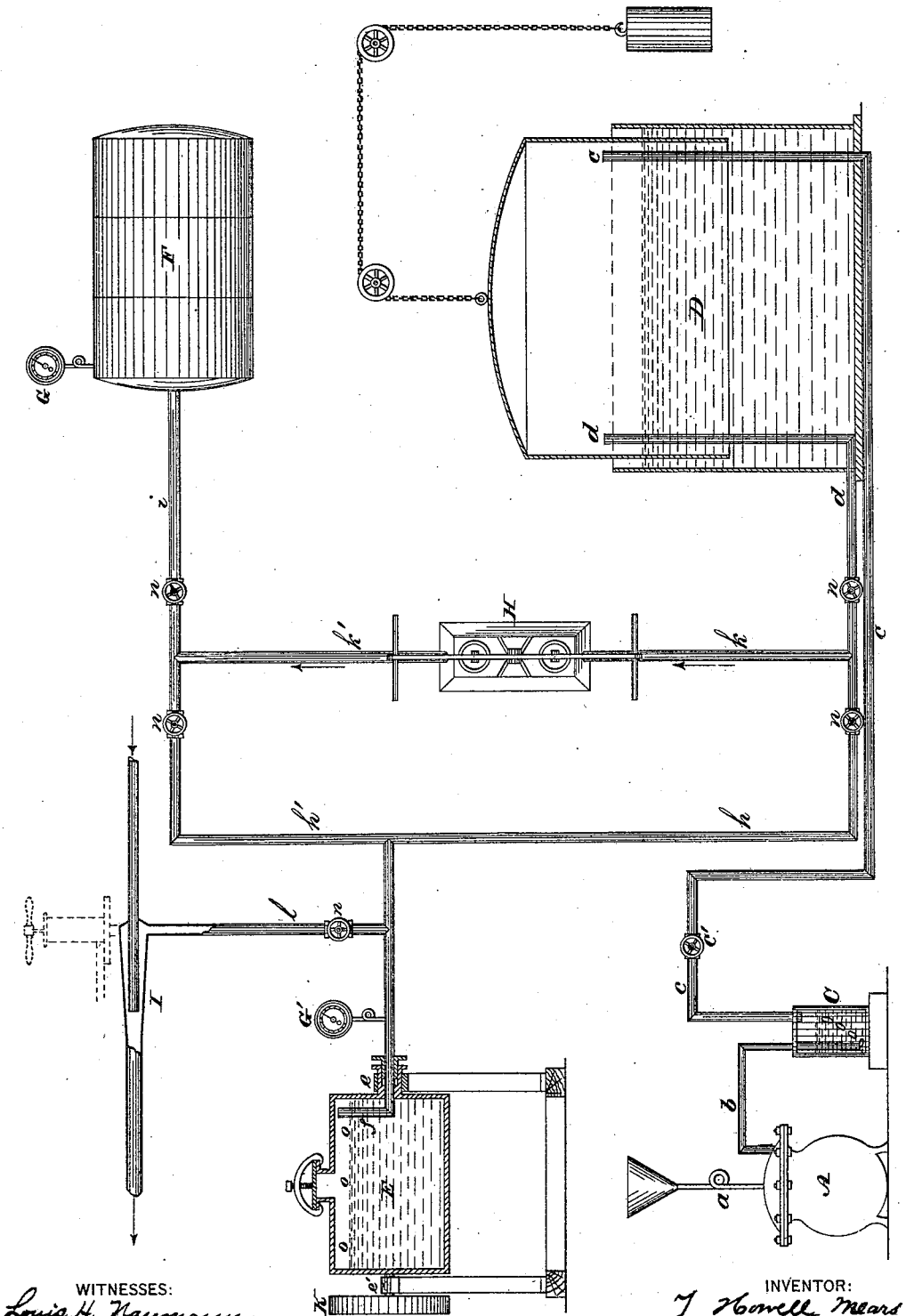
WITNESSES:
INVENTOR:
J. Howell Mears
BY
W. C. Witter ATTORNEY.

UNITED STATES PATENT OFFICE.

J. HOWELL MEARS, OF PHILADELPHIA, PENNSYLVANIA.

CHLORINATING ORES AND APPARATUS THEREFOR.

SPECIFICATION forming part of Letters Patent No. 269,441, dated December 19, 1882.

Application filed August 6, 1880. (No model.)

*To all whom it may concern:*

Be it known that I, J. HOWELL MEARS, M. D., a citizen of the United States, residing at Philadelphia, in the county of Philadelphia and State of Pennsylvania, have invented certain new and useful Improvements in Processes of Chlorinating Ores and in Apparatus Therefor, which improvements are fully set forth in the following specification.

My invention relates to improvements in the art of extracting gold and other metals from their ores by treating the latter, after suitable preliminary preparation, with chlorine gas, and afterward precipitating the metal from the product thus obtained, which is known as the "chlorination" process. This process is based upon the well-known property of chlorine gas, by virtue of which it unites with metallic gold, forming a soluble chloride of gold. The chloride, when dissolved in water, forms a solution, from which the metal may be precipitated in a metallic state.

My invention has for its object the facilitation of the process of chlorinating ores by materially lessening the time heretofore required for the introduction of the chlorine gas to the ore, for the impregnation of the ore therewith, and for the action of the chlorine upon the ore, and also to secure greater thoroughness and completeness in effecting the combination of the chlorine with the metal contained in the ore, as well as greater economy in the consumption of the chlorine gas itself.

To this end my improvement consists, first, in performing the operation of charging the ore with chlorine gas in a closed air-tight vessel from which the atmospheric air has previously been exhausted, in then forcing in the chlorine gas, so that it shall be under superatmospheric pressure while charging and acting upon the ore and undiluted, and in agitating the contents of the chlorinator during the process of charging the ore and while the gas is acting upon it; and, second, in the combination of a receptacle adapted to contain a supply of chlorine under superatmospheric pressure, a chlorinator adapted to resist pressure and to agitate its contents during the introduction of the gas, and an apparatus for exhausting the chlorinator, all suitably connected and combined, as hereinafter described.

The accompanying drawing represents an arrangement of apparatus, shown in vertical longitudinal section, suitable for carrying out my invention.

A is a generator or retort in which the chlorine gas is produced. This vessel is preferably constructed of sheet-lead.

The usual process of generating the gas consists in placing within the vessel a quantity of pulverized peroxide of manganese, common salt, and water. The cover is then secured and a quantity of sulphuric acid introduced through the bent leaden pipe $a$, which is formed into a funnel shape at its outer end. The chlorine gas generated by the action of the ingredients passes through another leaden pipe, $b$, which leads to a purifying apparatus, which may consist of a wash-bottle, C, in passing through which the gas is forced through a body of water, which takes up the muriatic acid contained in it. The chlorine then passes by a pipe, $c$, provided with a stop-valve, $c'$, into a balanced gas-holder, D, which may be of any suitable or well-known construction, and serves to contain a quantity of gas in a condition ready for use, as required.

H is an air-pump, of ordinary construction, so arranged as to be capable of drawing the gas from the gas-holder through the pipe $d$ $k$ and forcing it into the receptacle F through the pipe $k'$ $i$. The vessel or receptacle F should be made strong to withstand any pressure of gas that may be required in the operation about to be described—say forty or fifty pounds to the square inch, or as much more as may be found convenient or advisable.

E represents a section of the treating-vessel—sometimes termed a "chlorinator"—which is preferably constructed of a cylindrical or barrel shape, and is mounted on trunnions $e$ $e'$ and driven by the pulley K. The trunnion $e$ is hollow, and through it passes the pipe, with its goose-neck $f$, into the open space above the charge $o$ $o$ $o$. The chlorinator E is connected with the receptacle F by the goose-neck $f$ and the pipes $h'$ $i$ or, through the pump H, to the pump H by the goose-neck $f$ and the pipes $h$ $d$, or through the pump H.

I is the exhaust apparatus, which may be a steam-jet, a pump, a water-column, or any other suitable contrivance. It is connected with the chlorinator E by the pipe l and the goose-neck f, and to the receptacle F by the pipes l h' i.

n n n n n are cocks or valves to connect or disconnect the different parts of the apparatus.

G and G' are pressure and exhaust gages.

The following mode of procedure will be found to be well adapted to insure a successful result in practicing this process.

The gasometer D is put in order for holding the chlorine gas. The generator A is then charged with the necessary materials in the proper amounts for generating sufficient chlorine gas, which, passing through the wash-bottle C and connecting-pipes, fills the gasometer D. Connection is then made between the exhaust I and the receptacle F and the air is exhausted from the latter, after which the connection is closed and connection made between the receptacle F and the pump H, which is then connected with the gasometer D and started, pumping the gas from the gasometer into the receptacle until a pressure of, say, fifty or sixty pounds per square inch is obtained in the receptacle. A sufficient quantity of ore, which has been previously roasted, finely pulverized, and moistened by the addition of about five per cent. of water, is charged into the chlorinator E until it is nearly full, leaving only the open or upper end of the goose-neck not submerged. The cover is securely fastened until the vessel is perfectly air-tight, and it is then made to revolve preferably about twenty revolutions per minute. Connection is now made between the exhaust apparatus I and the chlorinator E through the goose-neck f and connecting-pipes, and all air is exhausted from the chlorinator. This connection is then closed and connection made between the chlorinator and the receptacle F, when the chlorine gas stored under pressure in the latter rushes into the chlorinator, and there acts under high pressure upon the gold contained in the ore, which is constantly kept in agitation. The agitation is continued until no more gas is absorbed by the contents of the chlorinator, which is generally from one to three hours, when the connection of the chlorinator with the receptacle F is closed and connection made with the gasometer D, into which will pass the greater portion of the unused chlorine gas from the chlorinator. The latter is now connected to the pump and the residue of chlorine gas remaining in it is forced into the receptacle F until the chlorinator is completely exhausted. Thus all the unused and uncombined gas is recovered undiluted and in the same condition as when it entered the chlorinator. The chlorinator is now opened and its contents discharged into a proper receptacle, after which the metallic chlorides may be collected and precipitated in the usual manner.

I am aware that various processes are described in publications prior to this application for the extraction of gold from its ores by the agency of chlorine gas, in which several of the steps of my process were employed in connection with other agencies. My process is an improvement upon these, in that it unites the three steps—vacuum, pressure, and agitation—in the one operation, thereby producing a new result, and, further, in that it dispenses with the use of steam and of heating agencies deemed essential in the old processes that employed pressure, and thereby again producing a new result.

My process requires and uses no heat, requires and uses no steam, does not generate the chlorine in presence of the ore, and accomplishes a new result in the saving of time and in the thoroughness of extraction of the gold.

I do not herein claim what has been secured to me in a prior patent of date September 18, 1877, and numbered 195,381, and the reissues thereof; but What I do claim, and desire to secure by Letters Patent, is—

1. The process of chlorinating ores which consists in exhausting the chlorinator containing the ore, then forcing in chlorine gas, so that such gas shall be under superatmospheric pressure while acting upon the ore, and agitating the contents of the chlorinator during the process, substantially as and for the purpose described.

2. The combination, substantially as hereinbefore set forth, of a receptacle constructed as described, whereby it may contain a supply of chlorine under superatmospheric pressure, a chlorinator constructed as described, whereby it may resist pressure and agitate its contents, and connections, as described.

3. The combination, substantially as hereinbefore set forth, of a receptacle constructed as described, whereby it may contain a supply of chlorine under superatmospheric pressure, a chlorinator constructed as described, whereby it may resist pressure and agitate its contents, an apparatus for exhausting the said chlorinator, and connections, as described.

4. The combination, substantially as hereinbefore set forth, of the generator A, the holder D, the pump H, the reservoir F, the exhaust I, the chlorinator E, the goose-neck f, and connections, as described.

5. The combination, substantially as hereinbefore set forth, of the generator A, the holder D, the pump H, the reservoir F, the chlorinator E, the goose-neck f, and connections, as described.

Signed by me this 28th day of July, A. D. 1880.

J. H. MEARS.

Witnesses:
J. B. MEARS,
H. C. McALLISTER.